United States Patent
Kriman et al.

(10) Patent No.: US 10,732,428 B2
(45) Date of Patent: Aug. 4, 2020

(54) LOW-TEMPERATURE HERMETIC SEALING FOR DIFFRACTIVE OPTICAL ELEMENT STACKS

(71) Applicant: APPLE INC., Cupertino, CA (US)

(72) Inventors: Moshe Kriman, Tel Aviv (IL); Adar Magen, Herzliya (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/254,637

(22) Filed: Jan. 23, 2019

(65) Prior Publication Data

US 2019/0171030 A1    Jun. 6, 2019

Related U.S. Application Data

(62) Division of application No. 14/870,040, filed on Sep. 30, 2015, now Pat. No. 10,234,695.

(60) Provisional application No. 62/116,574, filed on Feb. 16, 2015.

(51) Int. Cl.
| | |
|---|---|
| *G02B 27/42* | (2006.01) |
| *G02B 5/18* | (2006.01) |
| *G02B 7/00* | (2006.01) |
| *C03B 23/20* | (2006.01) |
| *G02B 27/00* | (2006.01) |

(52) U.S. Cl.
CPC .......... *G02B 27/4277* (2013.01); *C03B 23/20* (2013.01); *G02B 5/1814* (2013.01); *G02B 5/1852* (2013.01); *G02B 5/1857* (2013.01); *G02B 7/00* (2013.01); *G02B 27/0006* (2013.01)

(58) Field of Classification Search
CPC . G02B 27/0006; C03B 23/207; C03B 23/217; C03B 23/245; H05K 5/066
USPC .......................................................... 359/567
See application file for complete search history.

(56) References Cited

U.S. PATENT DOCUMENTS

| | | | | |
|---|---|---|---|---|
| 6,317,274 | B1 * | 11/2001 | Kato | G02B 5/1866 |
| | | | | 359/355 |
| 7,396,741 | B2 * | 7/2008 | Mund | B81C 1/00269 |
| | | | | 257/730 |
| 9,052,476 | B2 * | 6/2015 | Tong | G02B 6/4204 |
| 2002/0024734 | A1 * | 2/2002 | Nakabayashi | G02B 5/1814 |
| | | | | 359/569 |
| 2012/0097415 | A1 * | 4/2012 | Reinert | H01L 27/14618 |
| | | | | 174/50 |

(Continued)

FOREIGN PATENT DOCUMENTS

| | | |
|---|---|---|
| CN | 202855741 U | 4/2013 |
| WO | 9813825 A2 | 4/1998 |
| WO | 2012137452 A1 | 10/2012 |

OTHER PUBLICATIONS

CN Application # 201580076239.X office action dated Mar. 20, 2019.

(Continued)

*Primary Examiner* — Collin X Beatty
(74) *Attorney, Agent, or Firm* — Kligler & Associates Patent Attorneys Ltd

(57) ABSTRACT

A method for producing an optical apparatus includes providing a pair of glass wafers. One or more diffractive optical elements (DOEs) are formed on one or more of the glass wafers. A spacer is positioned between the glass wafers so as to define a cavity containing the DOEs, and a hermetic seal that bonds the glass wafers together and seals the cavity is formed.

13 Claims, 5 Drawing Sheets

(56) References Cited

U.S. PATENT DOCUMENTS

2014/0290847 A1   10/2014   Lee et al.

OTHER PUBLICATIONS

KR Application # 10-2019-7020093 office action dated Jul. 15, 2019.
European Application # 15826000.0 office action dated Oct. 28, 2019.

* cited by examiner

LOW-TEMPERATURE HERMETIC SEALING FOR DIFFRACTIVE OPTICAL ELEMENT STACKS

CROSS-REFERENCE TO RELATED APPLICATIONS

This application is a division of U.S. patent application Ser. No. 14/870,040, filed Sep. 30, 2015, which claims the benefit of U.S. Provisional Patent Application 62/116,574, filed Feb. 16, 2015, whose disclosure is incorporated herein by reference.

TECHNICAL FIELD

Embodiments described herein relate generally to optical devices, and particularly to methods and systems for sealing diffractive optical elements.

BACKGROUND

Miniature optical projectors are used in a variety of applications. For example, such projectors may be used to cast a pattern of coded or structured light onto an object for purposes of three-dimensional (3D) mapping of the projected objects (also known as depth mapping).

Optical projectors may, in some applications, project light using one or more diffractive optical elements (DOEs). For example, U.S. Patent Application Publication 2009/0185274, whose disclosure is incorporated herein by reference, describes apparatus for projecting a pattern that includes a first DOE configured to diffract an input beam so as to generate a first diffraction pattern on a first region of a surface, the first diffraction pattern including a zero order beam. A second DOE is configured to diffract the zero order beam so as to generate a second diffraction pattern on a second region of the surface such that the first and the second regions together at least partially cover the surface.

SUMMARY

An embodiment that is described herein provides a method for producing an optical apparatus, including providing a pair of glass wafers and forming one or more diffractive optical elements (DOEs) on one or more of the glass wafers. A spacer is positioned between the glass wafers so as to define a cavity containing the DOEs, and a hermetic seal that bonds the glass wafers together and seals the cavity is formed.

In some embodiments, forming the DOEs includes molding a diffractive pattern in a polymer layer. In other embodiments, forming the DOEs includes patterning a diffractive pattern in at least one of the glass wafers. In an embodiment, forming the hermetic seal includes coating the spacer with a first metal layer. In another embodiment, the spacer includes a polymer. In yet another embodiment, the spacer includes a glass.

In some embodiments, the spacer positioning includes creating the spacer by forming a cavity in one or more of the glass wafers. In other embodiments, forming the hermetic seal includes bonding eutectic metal alloys. In yet other embodiments, forming the hermetic seal includes performing direct oxide bonding.

In an embodiment, the method further includes, before performing the direct oxide bonding, polishing and cleaning bonding surfaces of at least one of the glass wafers and of the spacer. In another embodiment, performing the direct oxide bonding includes heating and pressing the glass wafers towards one another. In yet another embodiment, performing the direct oxide bonding includes pressing the glass wafers toward one another at room temperature.

In some embodiments, the spacer includes a glass spacer having a first surface, each of the glass wafers has a second surface, and forming the hermetic seal includes welding the first and second surfaces. In other embodiments, welding the surfaces includes performing laser-assisted micro welding. In yet other embodiments, forming the hermetic seal includes forming an electrical conductive polymer coated with a second metal layer.

There is additionally provided, in accordance with an embodiment that is described herein, an optical apparatus including a pair of glass wafers, one or more diffractive optical elements (DOEs), a spacer, and a hermetic seal. The DOEs are formed on one or more of the glass wafers, the spacer is positioned between the glass wafers so as to define a cavity containing the DOEs, and the hermetic seal bonds the glass wafers together and seals the cavity.

There is additionally provided, in accordance with an embodiment that is described herein, an optical apparatus including a light source and a diffractive optical element (DOE) assembly. The light source is configured to emit light. The DOE assembly is configured to project a pattern of light in response to the light emitted by the light source. The DOE assembly includes a pair of glass wafers, one or more DOEs, a spacer and a hermetic seal. The DOEs are formed on one or more of the glass wafers, the spacer is positioned between the glass wafers so as to define a cavity containing the DOEs, and the hermetic seal bonds the glass wafers together and seals the cavity.

These and other embodiments will be more fully understood from the following detailed description of the embodiments thereof, taken together with the drawings in which:

DETAILED DESCRIPTION OF EMBODIMENTS

Overview

Figure 1:
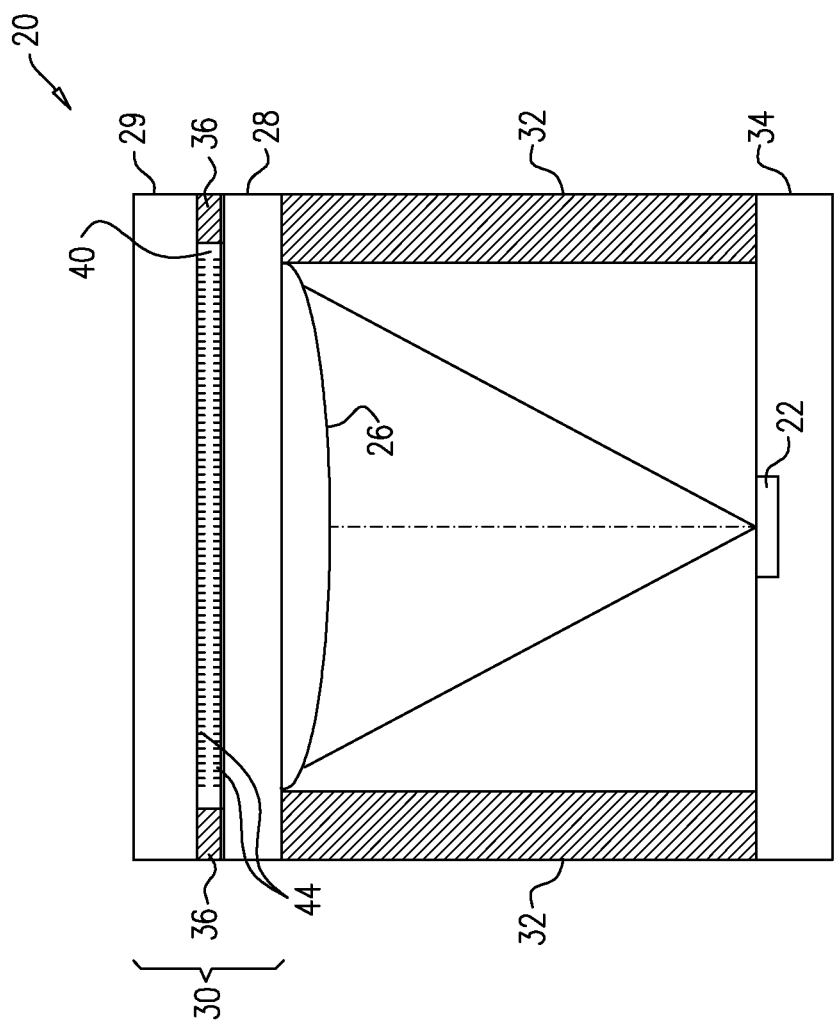
FIG. 1 is a schematic sectional view of an integrated photonics module (IPM), in accordance with an embodiment that is described herein.

Compact optical pattern projectors may be used, for example, in three-dimensional (3D) mapping. Optical projectors that are based on diffractive optical elements (DOEs) devices may exhibit a "zero-order problem," in which the DOE diffracts only part of an input beam, and the non-diffracted part of the beam may continue straight through to the projection volume. In addition, degradation in the DOE efficiency over time and usage, accompanied with an increase in the zero-order intensity, may cause the DOE to diffract the beam in a direction other than the intended direction, and may cause eye hazard and/or reduce optical performance of the system.

The DOE surface typically comprises a very fine diffractive surface. During system operation (or production), moisture or other contaminants may adhere to an active surface of the DOE, and may cause DOE efficiency loss, or even damage the entire DOE functionality in severe cases. Sealing a DOE assembly hermetically can be used to protect the DOE. DOE elements, however, are typically made of polymers that are susceptible to the high temperatures required in such hermetic sealing processes.

Embodiments that are described hereinbelow provide improved devices and methods for hermetically sealing DOE assemblies at low temperatures. In some embodiments, the disclosed methods comprise the main steps of forming one or more DOEs on one or more given glass wafers, positioning a spacer between the glass wafers so as to define a cavity that contains the DOEs, and forming a hermetic seal that bonds the glass wafers together and seals the cavity.

In example embodiments, the methods comprise placing epoxy spacers between two wafers that comprise the DOE elements, and coating the spacers with metal layers, such as gold and indium or gold and tin, during a low temperature process, to form a eutectic compound that hermetically seals the DOE assembly.

In other embodiments, a non-sealed DOE assembly is first formed using epoxy spacers. Metal bond rings are deposited at the perimeter of each DOE assembly, and the DOEs are placed between the metal rings. The wafers are finally diced to form an array of singulated DOE assemblies. The method further comprises molding the array with a conductive polymer between the DOE assemblies, dicing the conductive mold and plating the mold with a conductive layer (the layer is typically made of copper and/or nickel) so as to form hermetically sealed DOE assemblies.

In an embodiment, the methods comprise etching a cavity in two glass wafers with upper surfaces around them (or placing a glass spacer between the two wafers without etching, so as to create a cavity), replicating DOEs in the horizontal surface of the cavities, polishing and cleaning the upper surfaces (or the spacers), bonding the wafers using low-temperature direct oxide bonding techniques (or laser welding) and dicing the wafers to form an array of singulated DOE assemblies.

In another embodiment, producing the sealed DOEs comprises depositing, on two glass wafers, metal rings (typically made of gold and indium, or gold and tin) around every intended DOE stack, thus forming a cavity for each intended DOE assembly in each wafer (by etching into the wafer or by using a glass spacer between the wafers). DOE elements are replicated in the horizontal surface of each respective cavity, and the wafers are bonded using low temperature metal bonding techniques, as described above. The wafer stack is then diced to form an array of singulated DOE assemblies.

The techniques described above enable DOE manufacturers to produce and replicate sealed DOE elements using a low-temperature process. The DOE manufacturer is therefore flexible in selecting the DOE materials, without compromising the safety and performance of the DOE device. In alternative embodiments, the DOE elements may be patterned directly in the surface of the glass wafer instead of disposing epoxy DOEs on the wafers. Such DOE elements are not susceptible to high temperatures, and therefore sealing the DOE assemblies hermetically can be performed using conventional high temperature sealing techniques. Furthermore, hermetically sealed DOE assemblies allow using the optical pattern projectors in high moisture and/or intensive airborne particle environments without exposing users to eye hazard and/or reducing the optical performance of the projectors.

System Description

FIG. 1 is a schematic sectional view showing details of an integrated photonics module (IPM) 20, in accordance with an embodiment that is described herein. IPM 20, as shown in this figure, comprises a light source, in the present example a vertical-cavity surface-emitting laser (VCSEL) 22 placed on a substrate in the form of a silicon optical bench 34. VCSEL 22 is electrically and mechanically bonded to optical bench 34, and emits light radiation in the near-infrared range (for example, between 900 nm and 1000 nm or any other suitable wavelength) along an axis that is orthogonal to the optical bench.

Alternatively, the light source may comprise other suitable types of coherent or non-coherent solid-state emitters. For example, IPM 20 may comprise an edge-emitting light source, such as a GaAs laser diode, which emits light radiation along an axis that is parallel to the optical bench. A 45° mirror reflector (not shown) may be formed in the optical bench or produced as a discrete element, so as to reflect the laser radiation upward at a desired angle (in this case 90°) relative to the surface of the optical bench.

A lens 26 collects and collimates light from VCSEL 22 and directs the light through a diffractive optical element (DOEs) stack 30, also referred to herein as a DOE assembly. The stack comprises a pair of glass plates 28 and 29, which are typically substantially similar. Plates 28 and 29 are typically diced from respective glass wafers, as will be described in detail blow. In the description that follows, for the sake of clarity, the terms "wafers" (before dicing) and "plates" (after dicing) are used interchangeably.

One or more DOEs 44 are formed on one of the glass plates (typically on the wafers prior to dicing), or on both. In some embodiments, DOEs 44 are produced by replication (molding) of the diffractive pattern in a polymer layer, such as an epoxy polymer layer, that is deposited on one of the glass wafers. A spacer 36 is typically placed between plates 28 and 29 to form a cavity 40 between the plates (and in some embodiments between DOEs 44 placed on the opposite wafers) so as to form DOE stack 30. Spacer 36 is typically diced, along with plates 28 and 29, from a spacer wafer. Again, for the sake of clarity, the terms "spacer" and "spacer wafer" are used interchangeably.

In some embodiments, IPM 20 is configured to project a structured light on one or more objects of a scene. The light is reflected from the objects to one or more sensors (not shown) in order to form a set of three-dimensional (3D) and/or two-dimensional (2D) maps of the objects. The optical elements (lens 26 and DOE stack 30) that receive and transmit the light from VCSEL 22 are mounted on bench 34 by means of spacers 32.

It should be noted that the IPM of FIG. 1 includes only elements that are necessary to describe the principles of the IPM operation. Real-life IPMs, typically comprise additional components related to the VECSEL and optical path.

The embodiments described herein focus mainly on DOE stack 30. The configuration of IPM 20 in FIG. 1 is provided by way of example, for demonstrating an example system or device in which DOE stack 30 may be integrated and used. Alternatively, any other suitable configurations can also be used. DOE stacks such as stack 30 may be used in various other applications other than structured light projection, for example, beam splitters, fiber optics applications, laser machining application, pattern generators, and various projection applications.

Low-Temperature Hermetic Sealing of Doe Stacks

In optical pattern projectors that are based on DOEs, part of the input laser beam (referred to as the zero diffraction order part) may not be diffracted by the DOEs as designed, but continue straight through to the projection volume. Adhesion of small amounts of moisture or other contaminants to the active surface of the DOEs, on which a very fine diffractive pattern is formed, may cause changes in the fine diffractive pattern, and may degrade the efficiency of the DOEs. Such changes may create safety issues (e.g., an eye injury due to an exposure to deflected laser light) and/or degraded system performance.

In some embodiments, DOE stack 30 is hermetically sealed so as to prevent moisture or other contamination from penetrating into cavity 40. Methods for hermetic sealing that are known in the art typically apply a sealing process at temperatures of 300° C. or higher. Such high temperatures are likely to damage the structure of the replicated epoxy polymer, which typically tolerates temperatures up to 250° C.-270° C., applied for short times.

Embodiments that are described hereinbelow provide techniques for low-temperature hermetic sealing that are suitable for use with replicated epoxy DOEs, or with devices having patterned DOEs on the glass wafers. FIGS. 1-5 specifically illustrate implementations in which a pair of complementary DOEs are sealed together face-to-face in a cavity formed between two glass wafers. In alternative embodiments, however, the DOE stack may comprise any number of glass wafers, e.g., two or more pairs of glass wafers with complementary DOEs, or an odd number of glass wafers of which some of the wafers are arranged in a face-to-back configuration. The principles used in these embodiments may be equally applied, however, to seal and protect a single DOE or any other suitable DOEs configuration.

Figure 2:
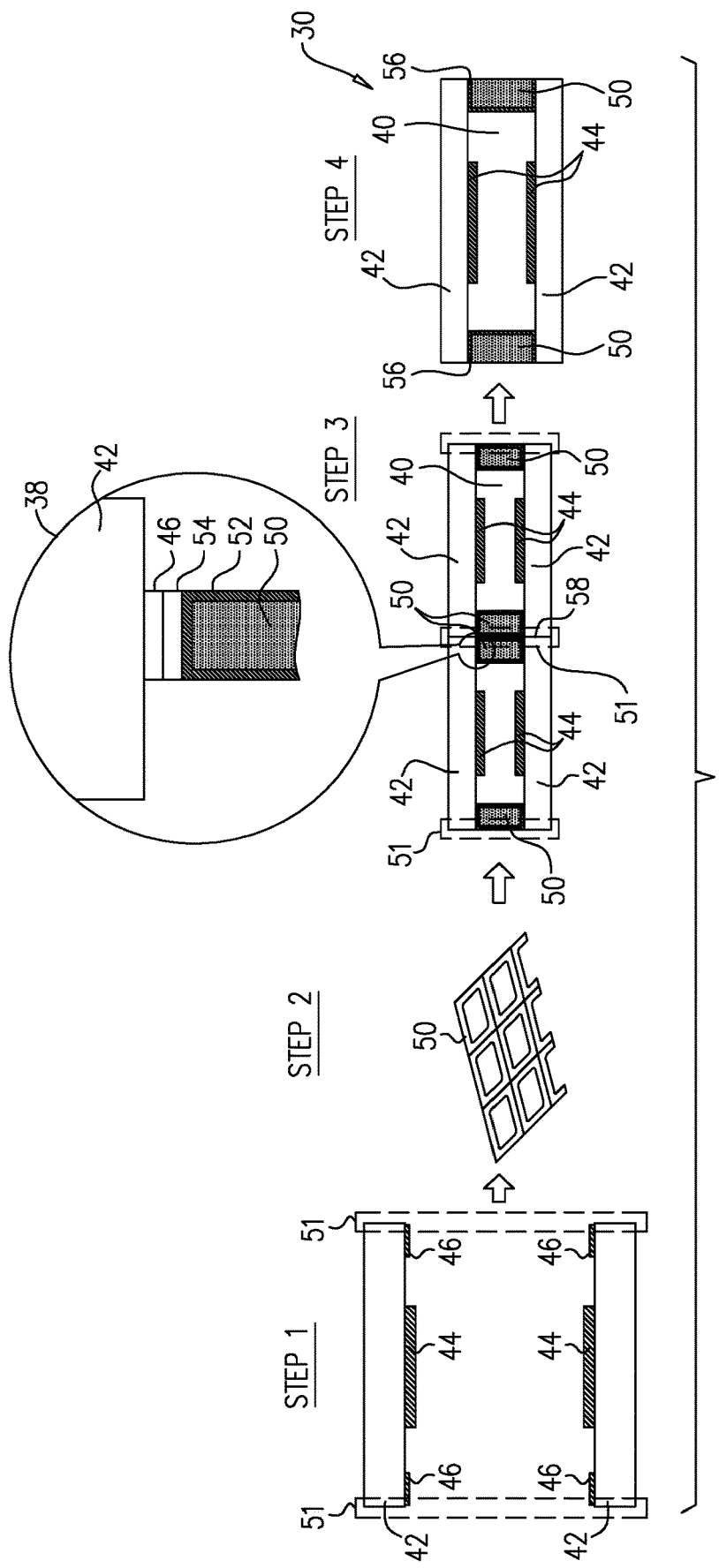
FIGS. 2-5 are schematic sectional views of process sequences for producing hermetically sealed encapsulations of diffractive optical element (DOE) stacks, in accordance with several embodiments that are described herein.

FIG. 2 is a diagram that schematically illustrates a sectional view of a process sequence for producing a hermetically sealed encapsulation of DOE stack 30, in accordance with an embodiment that is described herein. The process begins at a step 1 with a pair of glass wafers 42. (FIG. 2, as well as FIGS. 3-5 below, shows only a small section of the pair of wafers, for the sake of clarity. Wafers 42 typically comprise a large periodic two-dimensional array of such sections.) The wafers may be square with an edge length in the range of 150 mm to 200 mm (or any other suitable size.) Alternatively, the wafers have a round shape with a diameter of the above range.

The thickness of the wafers is on the order of 200 µm. In alternative embodiments, the wafers may have other suitable shape, size and/or thickness to accord with the device specification and/or with the requirements and capabilities of the underlying production technology. Each of wafers 42 comprises an array of DOE stacks 30 (not shown) separated by a crisscross net of dicing areas 51 for dicing the wafers into multiple DOE stacks.

Step 1 comprises depositing metal bonding lines 46 around the edge of each DOE stack 30. In some embodiments, bonding lines 46 are made of gold and have a typical thickness of 1-3 µm. The gold layer may comprise a submicron seed layer on which the bulk gold is sputtered. In alternative embodiments, bonding lines 46 may comprise an indium layer coated with gold of the same or similar thickness. In yet other embodiments, bonding lines 46 may comprise an alloy typically comprising 80% gold and 20% tin. Step 1 ends with forming one or more DOEs 44 on the surface of at least one of the wafers. In some embodiments, only one DOE may be formed on one wafer 42 while the other wafer comprises only bonding lines 46. This configuration typically results in a single reflection of the laser beam toward the objects in the scene. In other embodiments, both wafers 42 comprise one or more DOEs. Typically, each DOE may comprise an optical surface having a fine diffraction pattern profile so as to create a desired structured light.

At a step 2, the process comprises fabricating a spacer wafer 50 for insertion between the glass wafers. The spacer wafer has openings at the locations of the DOEs. Spacer wafer 50 has a typical thickness of 100 µm and may be made of a polymer material, such as epoxy, FR4, or polyimide. Alternatively, the spacer wafer may be made of any suitable metal (or metallic alloy) or glass. In an embodiment, the openings in spacer wafer 50 are aligned with the locations of DOEs 44 so as to form a cavity 40 between the glass wafers, leaving space for placing the DOEs.

In an embodiment, the process continues by plating the entire spacer wafer 50 with a base metal film (e.g., copper and/or nickel) 52 (e.g., using electroplating or electroless techniques), followed by fabricating thin layers (typically 2-3 µm thick) of low-temperature eutectic alloys 54, such as gold-indium, gold-tin or copper-tin alloys.

At a step 3, the coated spacer wafer is inserted between the two glass wafers, which are then pressed together and heated to a sufficiently high temperature (typically about 200° C.). Referring to an inset 38, alloy 54 forms a eutectic bonding between metal film 52 (located on spacer 50) and bond lines 46 (located on glass wafers 42). The eutectic bonding forms hermetic sealing between spacer wafer 50 and glass wafers 42 thus hermetically enclosing cavity 40 including the DOEs. In some embodiments, the bonding process may be carried out in an atmospheric environment or, alternatively, in vacuum or under a flush of dry gas.

At a step 4, the process comprises dicing the bonded stack (of glass wafers 42 and spacer wafer 50) at dicing area 51, using any suitable dicing technique (e.g., sawing, laser dicing). The dicing operation forms multiple units of DOE stacks 30. Each DOE stack 30 comprises a sealed encapsulation that protects DOEs 44 residing in cavity 40 from moisture or contaminants.

Figure 3:
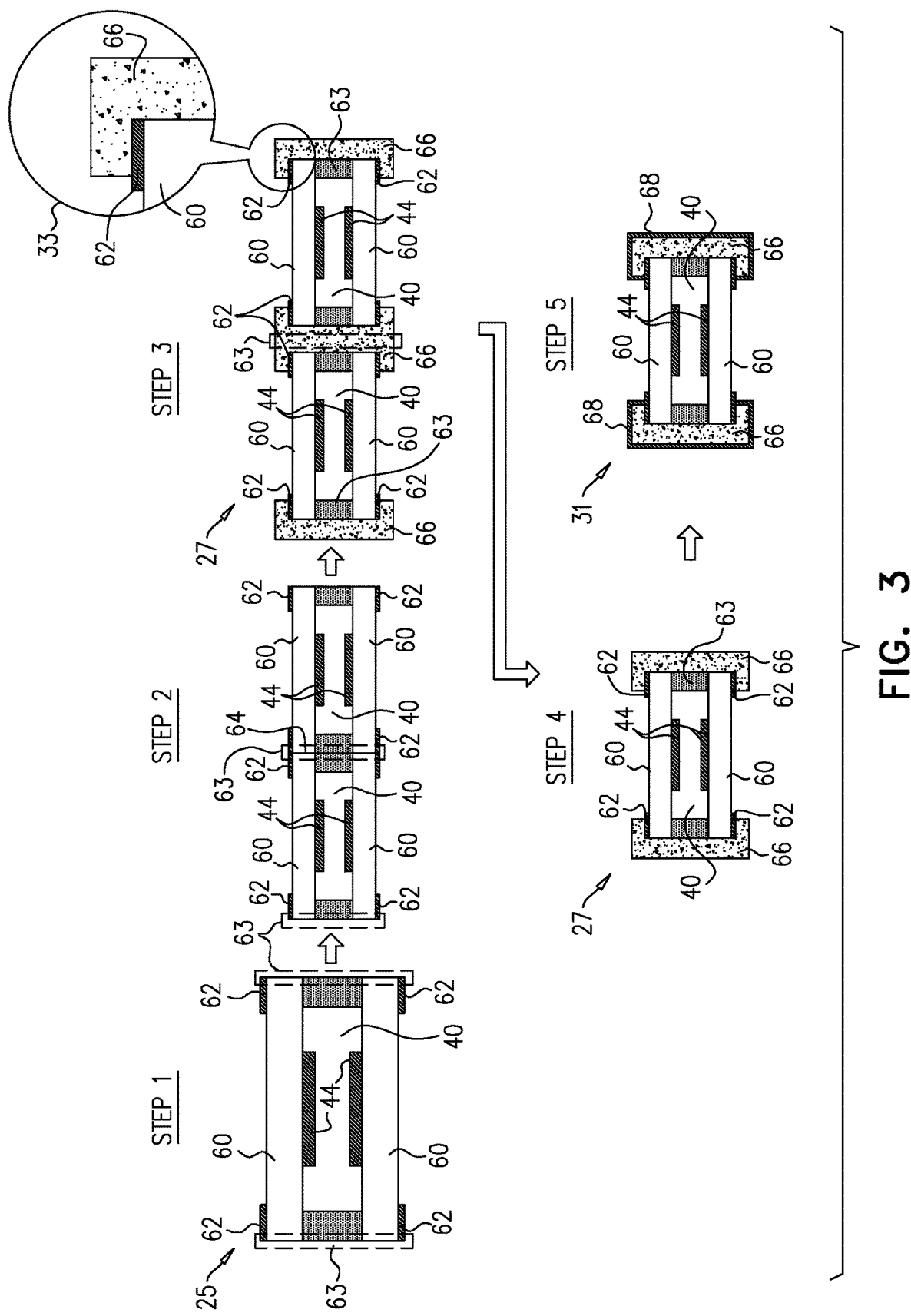

FIG. 3 is a diagram that schematically illustrates a sectional view of a process sequence for producing a hermetically sealed encapsulation of a DOE stack 31, in accordance with an embodiment that is described herein. DOE stack 31 may serve, for example, as DOE 30 in IPM 20 of FIG. 1 above. The process begins at a step 1 with plating a metal bond ring layer 62 (e.g., copper, nickel and/or gold) on the outer side of each of a pair of glass wafers 60. The process additionally comprises forming one or more DOEs 44 on the surface of at least one of the wafers, and bonding the two glass wafers (without hermetically sealing cavity 40) by inserting a suitable polymer spacer wafer 63 between the glass wafers, so as to form a wafer-level DOE stack 25. The polymer spacer wafer comprises openings at the DOE locations as described in FIG. 2.

At a step 2, the process comprises dicing stack 25 at an area 63 to create an array of multiple singulated assemblies, and fitting stacks 25 into a mold (not shown). At a step 3, the process comprises filling the mold with a suitable conductive overmold 66 so as to form a reconstituted wafer-level DOE stack 27. Overmold 66 is typically made of conductive epoxy or carbon filled with metallic grains. Overmold 66 is adapted to fill the areas between the edges of the singulated DOE assemblies and to leave optical apertures over DOEs 44. Referring to an inset 33, note that metalized bond lines 62 are wider than the edge of overmold 66, and therefore protrude slightly into the clear optical apertures.

At a step 4, the process comprises dicing wafer-level DOE stack 27 by cutting vertically through overmold 66 so as to create an array of multiple singulated DOE stacks 27. At a step 5, the process comprises plating each singulated DOE stack with a conductive layer 68 so as to form a hermetically sealed DOE stack 31. Layer 68 comprises a copper and/or nickel layer having a typical thickness of 10-20 µm, and is implemented using an electroless coating process. During the electroless coating process, only conductive surfaces are coated with layer 68. Thus, coating overmold 66 and lines 62 and leaving glass wafers 60 uncoated, retains a clear optical aperture for the laser beam of VCSEL 22.

Figure 4:
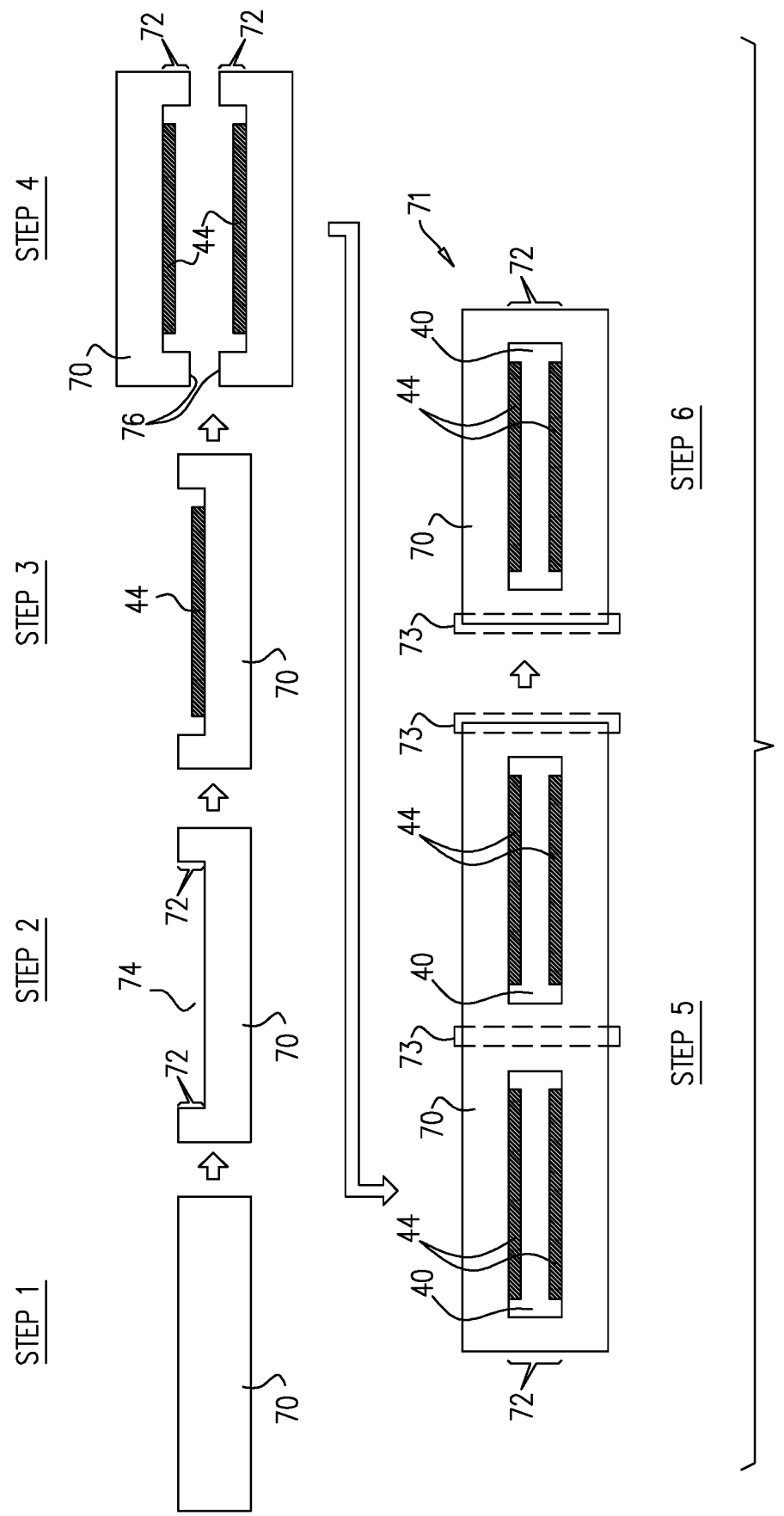

FIG. 4 is a diagram that schematically illustrates a sectional view of a process sequence for producing a hermetically sealed encapsulation of a DOE stack 71, in accordance with another embodiment that is described herein. DOE stack 71 may serve, for example, as DOE 30 in IPM 20 of FIG. 1 above. The process comprises a glass-to-glass encapsulation process, and begins at a step 1 with a first glass wafer 70, which is typically 300 µm thick (thicker than wafers 42 and 60 depicted in FIGS. 2-3, which are typically 200 µm thick).

Wafer 70 comprises an array of DOE stacks and the following process sequence is performed at a wafer-level. For the sake of clarity, FIG. 4 depicts a process sequence that produces a single DOE stack 71.

At a step 2, the process comprises etching a cavity at the center area of wafer 70, to a typical depth of 50 µm. As a result, the etched wafer comprises a perimeter ring that is 300 µm thick, and a 250 µm thick cavity 74 surrounded by a 50 µm thick spacer 72. In an alternative embodiment, the process comprises placing spacer 72 on the surface of wafers 70 instead of etching the wafers. The functionality of shape of spacer 72 is similar to the functionality of spacer 50 as shown in step 2 of FIG. 2. In this embodiment, however, the spacer is made of glass and wafers 70 may be thinner (e.g., 250 µm). At a step 3, the process comprises molding one or more DOEs 44 on the horizontal surface of wafer 70, within cavity 74, using the replication techniques described in FIG. 1, and repeating a substantially similar process as described in steps 1-3 of FIG. 4 for a second, substantially similar, glass wafer.

At a step 4, the process comprises polishing and cleaning surface 76 of each wafer and positioning the wafers face-to-face such that the cavities and DOEs 44 of each wafer are facing each other. At a step 5, the process comprises bonding the wafers to form a hermetically sealed cavity 40 between spacers 72, by pressing the wafers towards each other at contact surfaces 76. In some embodiments, bonding the wafers comprises direct oxide bonding techniques, such as ZiBond® techniques of Ziptronix (North Carolina, US), in which pressing the wafers is carried out at room temperature, or pressing the wafers at a typical temperature in the range of 150° C.-200° C.

In alternative embodiments, laser-assisted micro welding techniques may be used for bonding the wafers, (and for bonding the glass spacer to the wafer, in case of placing a glass spacer rather than etching the wafer to form the cavity). The welding laser heats only the interface between surfaces 76 leaving other areas of the wafers at relatively low temperatures, thus, keeping DOEs 44 at room temperature (e.g., 25° C.) during the entire bonding process. Such techniques are provided, for example, by Primoceler (Tampere, Finland). At a step 6, the process comprises dicing the bonded wafers at an area 73 located between two adjacent cavities 40, so as to create an array of multiple singulated hermetically-sealed assemblies of DOE stack 71.

Figure 5:
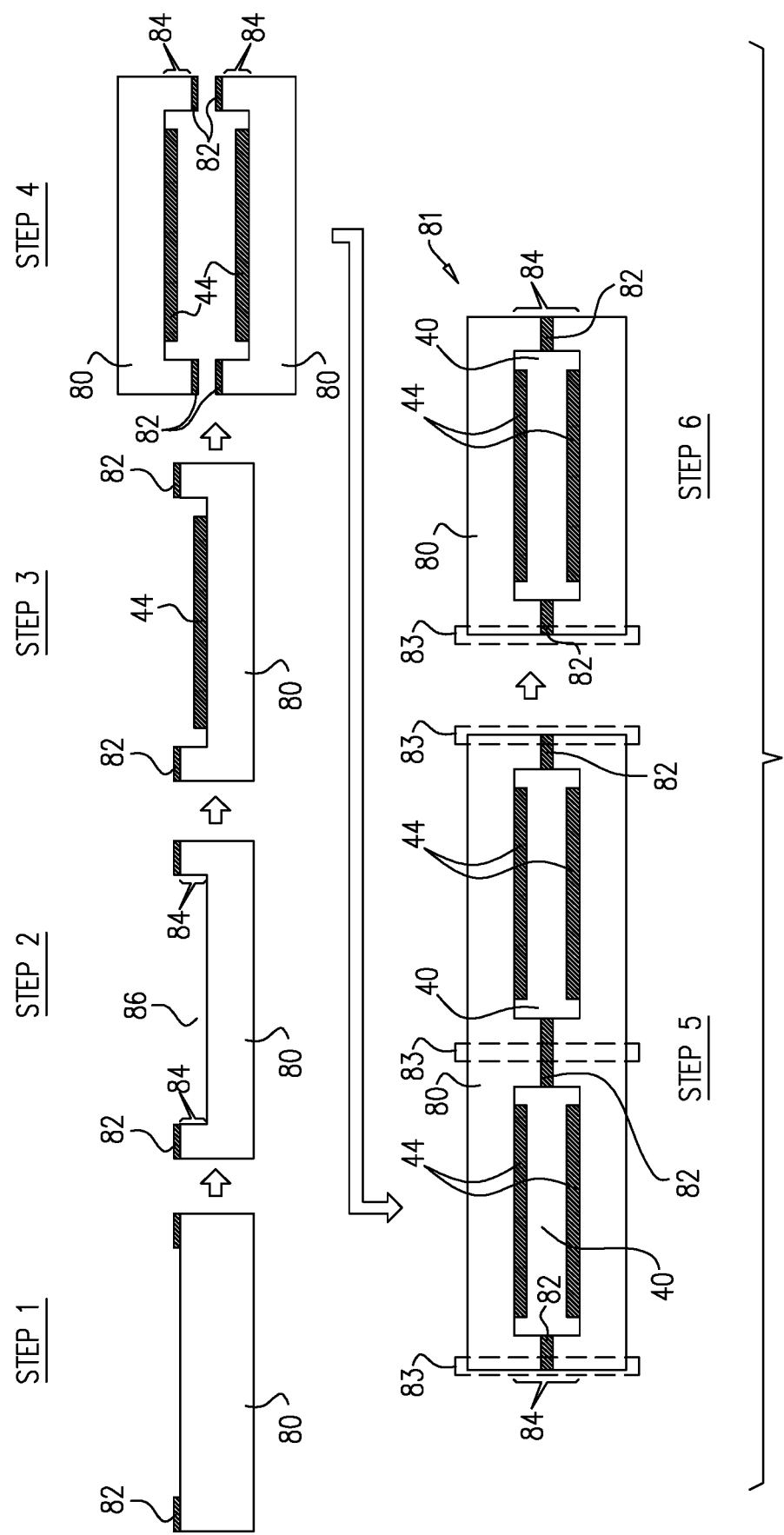

FIG. 5 is a diagram that schematically illustrates a sectional view of a process sequence for producing a hermetically sealed encapsulation of a DOE stack 81, in accordance with yet another embodiment that is described herein. DOE stack 81 may serve, for example, as DOE 30 in IPM 20 of FIG. 1 above. This technique comprises forming a glass spacer by etching a cavity in glass wafers 80, similarly to the process of FIG. 4, combined with depositing and welding metal layers on the spacers, as depicted in FIG. 2. The overall process produces a hermetically sealed encapsulation of DOE stack 81. The process begins with providing a pair of glass wafers 80, each wafer is typically 300 µm thick.

At a step 1, the process comprises depositing a metal layer 82 on wafer 80. Layer 82 defines areas in which DOE stacks 81 can be positioned on both wafers 80. Layer 82 comprises a gold film of 2-3 µm typical thickness, covered with an indium layer having a typical thickness of 2-3 µm, so as to form a eutectic layer as described above. In alternative embodiments, layer 82 may comprise a typical mixture of 80% gold and 20% tin. At a step 2, the process comprises forming, on wafers 80, a crisscross of a spacer 84 thus leaving space for DOE stacks 81. In an embodiment, forming the spacer is performed by etching 50 µm cavities 86 in both wafers as described in FIG. 4. In an alternative embodiment, the process comprises placing spacer 82 on the surface of wafers 80 instead of etching the wafers. The shape of spacer 82 is similar to the shape of spacer 50 as shown in step 2 of FIG. 2. In this embodiment, however, the spacer is made of glass and the wafers 80 may be thinner (e.g., 250 µm).

At a step 3, the process comprises molding one or more DOEs 44 on the horizontal surface of wafer 80, within cavity 86, using the replication techniques described in FIG. 1. At a step 4, the process comprises positioning the glass wafers so that the cavities and DOEs 44 of one wafer faces those of the other wafer. The process further comprises pressing the glass wafers towards each other at the location of layer 82, so as to form eutectic bonding of gold and indium (or gold and tin). This step is carried out at a typical temperature of 200° C. The eutectic bonding forms hermetic sealing of cavity 40 between the wafers. At a step 6, the process comprises dicing the bonded wafers at an area 83 located between two adjacent cavities 40, so as to create an array of multiple singulated hermetically-sealed assemblies of DOE stack 81.

The configurations of FIG. 2-5 above are depicted purely by way of example. In alternative embodiments, a DOE stack may be assembled from a pair of wafers in any other suitable way and using any other suitable type of spacing and/or hermetic sealing.

It will thus be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for producing an optical apparatus, the method comprising:
providing a pair of glass wafers;
forming one or more diffractive optical elements (DOEs) on one or more of the glass wafers;

positioning a spacer between the glass wafers so as to define a cavity containing the DOEs; and forming a hermetic seal that bonds the glass wafers together and seals the cavity by performing direct oxide bonding.

2. The method according to claim 1, wherein forming the DOEs comprises molding a diffractive pattern in a polymer layer.

3. The method according to claim 1, wherein forming the DOEs comprises patterning a diffractive pattern in at least one of the glass wafers.

4. The method according to claim 1, wherein positioning the spacer comprises creating the spacer by forming the cavity in one or more of the glass wafers.

5. The method according to claim 1, and comprising, before performing the direct oxide bonding, polishing and cleaning bonding surfaces of at least one of the glass wafers and of the spacer.

6. The method according to claim 1, wherein performing the direct oxide bonding comprises heating and pressing the glass wafers towards one another.

7. The method according to claim 1, wherein performing the direct oxide bonding comprises pressing the glass wafers toward one another at room temperature.

8. A method for producing an optical apparatus, the method comprising:

providing a pair of glass wafers;

forming one or more diffractive optical elements (DOEs) on one or more of the glass wafers;

positioning a spacer between the glass wafers so as to define a cavity containing the DOEs; and forming a hermetic seal that bonds the glass wafers together and seals the cavity, wherein the spacer comprises a glass spacer having a first surface, wherein each of the glass wafers has a second surface, and wherein forming the hermetic seal comprises welding the first and second surfaces.

9. The method according to claim 8, wherein welding the surfaces comprises performing laser-assisted micro welding.

10. A method for producing an optical apparatus, the method comprising:

providing a pair of glass wafers;

forming one or more diffractive optical elements (DOEs) on one or more of the glass wafers;

positioning a spacer between the glass wafers so as to define a cavity containing the DOEs; and forming a hermetic seal that bonds the glass wafers together and seals the cavity by forming an electrical conductive polymer coated with a metal layer.

11. The method according to claim 10, wherein the spacer comprises a polymer.

12. The method according to claim 10, wherein the spacer comprises a glass.

13. The method according to claim 10, wherein each of the glass wafers has a surface coated with a metal film, and wherein forming the hermetic seal comprises bonding eutectic metal alloys.

\* \* \* \* \*